UNITED STATES PATENT OFFICE.

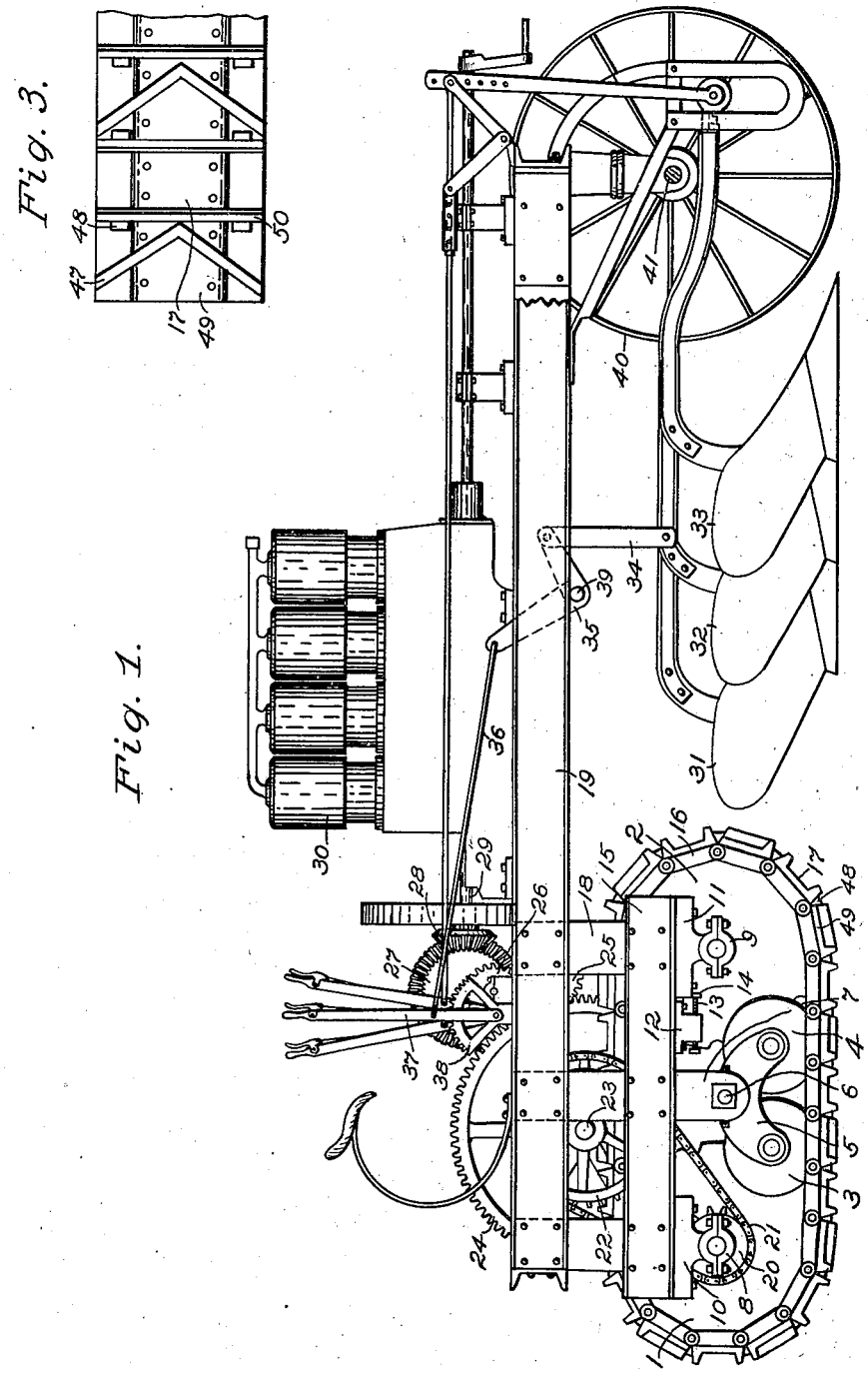

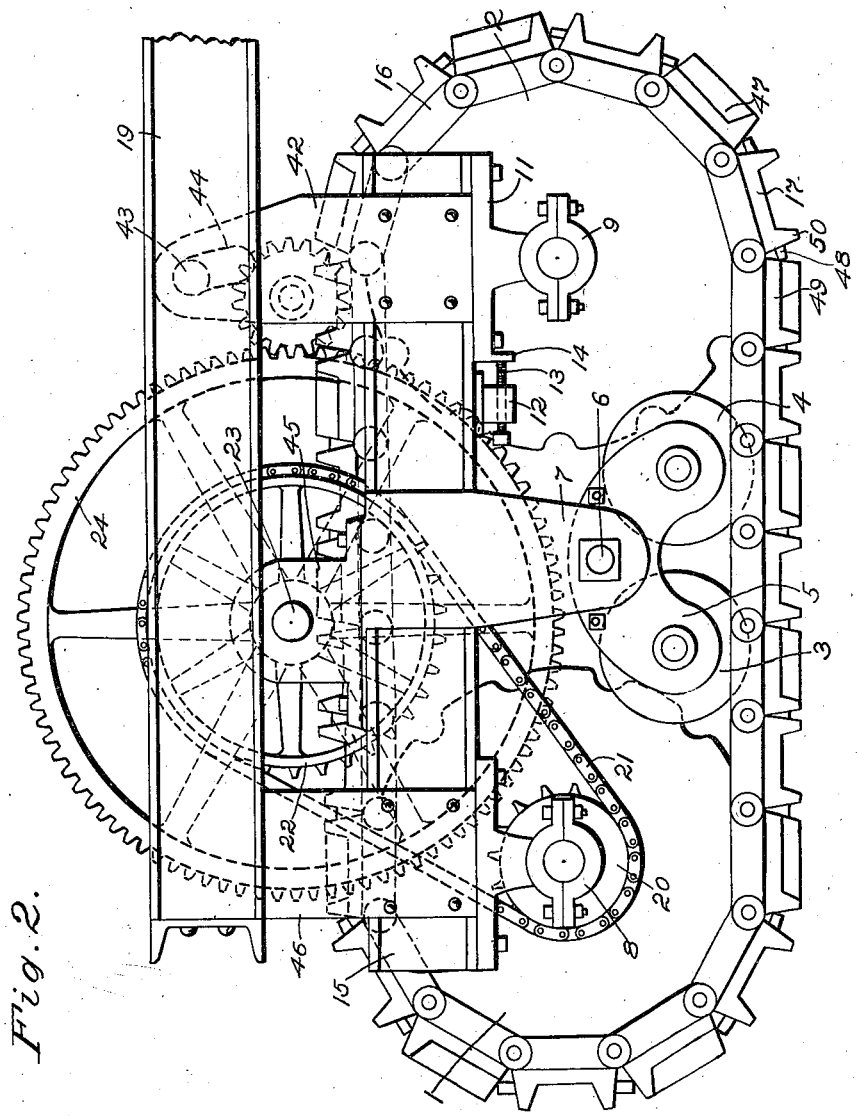

HARRY W. LEAVITT, OF WATERLOO, IOWA.

TRACTOR.

1,185,918.  Specification of Letters Patent.  Patented June 6, 1916.

Application filed June 11, 1912. Serial No. 703,015.

*To all whom it may concern:*

Be it known that I, HARRY W. LEAVITT, a citizen of the United States of America, and a resident of Waterloo, Blackhawk county, Iowa, have invented certain new and useful Improvements in Tractors, of which the following is a specification.

My invention relates to improvements in tractors, and more particularly to that species in which the usual traction-wheels are replaced by a link-belt traction-device, and my invention therefore relates especially to means adapted to render such a traveling link-belt device yieldable to render it able to readily mount and pass any ordinary irregularities of the surface traversed by it. This object I have accomplished by the mechanism which is hereinafter described and claimed, and which is illustrated in the accompanying drawings, in which:

Figure 1 is a right-hand side elevation of a tractor employing my improved yieldable link-belt traction-device. Figs. 2 and 3 are enlarged details of a modified form of said yieldable link-belt traction-device only.

Similar numerals of reference denote corresponding parts throughout the several views.

In the tractor shown in Fig. 1, its rectangular horizontal main frame 19 is supported in front on a pair of pivoted carrying-wheels 40, mounted with their axle 41 pivoted on a medial bolster for horizontal movements as directed by means of steering appliances not here shown. The rear part of said frame is supported on a link-belt 16 having laterally projecting ends, and carried on sprocket-wheels 1 and 2 of which the wheel 1 drives, the wheel 2 being idle. The outer parts of links 17 have projections or cleats 50 and the other plates 49 have cleats 47 to engage the surface moved over. A sub-frame 15 is connected rigidly to the under rear part of the main frame by hangers 18. The axles of the wheels 1 and 2 are seated in bearings 8 and 9 respectively, on said sub-frame. A middle hanger 7 on each side of the sub-frame supports the axle 6 of a rock-body 5 composed of spaced apart side-plates with depending bearings for two pairs of traveler-wheels 3 and 4 spaced apart, said travelers traveling or rotatable upon the lateral projections of the links of said belt upon opposite sides of the sprocket-wheels 1 and 2 to rock with the yielding belt under them, in turn as the latter passes obstructions. On the shaft of the sprocket-wheel 1 is secured a small sprocket-wheel 20 which is driven by means of a chain 21 from a sprocket-wheel 22 on a shaft 23. On the shaft 23 is fixed a large gear-wheel 24, which may be rotated by any intermediate system of gearing from the driving-shaft 29 of the engine 30, the latter mounted on said frame 19, such as the gear-wheels 26, 27 and 28, or as may be desired, with arrangements made for reversing the rotation of the wheel 24 by shifting out a gear 26 and shifting in a gear 25. Since the transmission means is not a part of this invention, I have not presented it specifically.

There is a wide space provided between the forward carrying-wheels 40 and the link-belt 16, whereby any suitable implement such as the connected plows 31, 32 and 33 may be seated therebetween, and connected to the forward part of the main frame by means of any suitable hitch, not herein specifically described. These plows, or other implement, may be raised or lowered by means of a link 34 connected between said plows and a bell-crank lever 35 pivoted on a pintle 39 of the frame 10, a link 36 connecting the other arm of said lever to a hand-lever 37, which has a movable spring-controlled detent of the usual type (not shown) adapted to detachably and adjustably engage teeth of a rack-sector 38 on said frame 19. The link-belt chain 16 is located suitably to travel in the furrow left by said plows, but may be otherwise located without departing from the principles of my invention. My invention resides especially in the provisions made for rendering the chain 16 yieldable with its idler-carrying-sprockets to permit it to mount and traverse obstacles or irregularities of the ground without shock or breakage of the tractor. In the device shown in Fig. 1, the outer sprocket-wheels 1 and 2 are rigidly mounted, but the wheel 2 has its hanger 11 mounted and connected to the sub-frame 15 to be slidable thereon, the adjustment being effected by means of a tension-screw 13 working in a block 12 on said sub-frame and engaging a projection 14 on the said hanger. A certain amount of flexibility is provided for said chain by means of mounting the inner pairs of wheels 3 and 4 in the ends of the rock-body 5, the latter being medially pivoted. When the chain, in traveling forward comes upon a stone or hard clod, the rock-body will shift to rock upwardly its forward part to lift the wheels 4, which permits the chain to climb over the obstruction, the rock-body then tilting back as the obstacle is passed. The same action takes place, but reversed, when the tractor is driven backwardly.

In Fig. 2 is shown a modification, wherein the sub-frame 15 itself is made tiltable to give a greater degree of flexibility to the traction-device. This is done by modifying the form of the middle hanger 7 so that its upper part 45 is hung pivotally on the end of the shaft 23. The forward hanger 42 has its upper end provided with an arc-shaped slot 44, adapted to slidably receive a fixed stud 43 projected from the inside face of said main frame, or some fixed structure thereon, the latter coöperating parts being shown only by dotted lines. At the rear end of the sub-frame the part 46 acts as a stop-piece to limit the swing of the sub-frame in one direction. By this arrangement, the wheels 1 and 2 may swing up or down as well as the other wheels 3 and 4, thus rendering the whole traction-device more flexible than that shown in Fig. 1, and adapted for service where the ground is more than usually irregular or strewn with obstacles.

Fig. 3 shows the outer faces of the link-plates of said chain, arranged alternately, with the plates 17 having the longitudinal straight marginal flanged treads 50, and the plates 49 having chevron shaped treads 47. Lugs 48 projects from the plates 17 and are adapted to overlap the plates 49, to keep the plates alined and locked when under the wheels 3 and 4, preventing side displacement.

Having described my invention, what I claim as new, and desire to secure by Letters Patent, is:

In combination, a link-belt having wide links flattened on their inwardly-directed faces, a main-frame located above said link-belt, a sub-frame located below said main-frame and having longitudinally-spaced hanger-bearings, one of said bearings being longitudinally adjustable on said sub-frame, sprocket-wheels within and meshing with opposite ends of said link-belt and having shafts mounted rotatably in said hanger-bearings, a sprocket-pinion fixed on one of said shafts, a driving-shaft rotatably mounted in said main-frame, a sprocket-wheel fixed on said driving-shaft, a sprocket-chain operatively connecting said sprocket-wheel and said sprocket-pinion, a pair of transversely-spaced hangers depending fixedly medially from said sub-frame, a shaft fixed across said hangers, a pair of transversely-spaced downwardly-curved rock-bodies pivotally mounted on said fixed shaft, transverse shafts mounted between the ends of said spaced rock-bodies, pairs of transversely-spaced flat-tread wheels mounted rotatably on said last-mentioned shafts and adapted to bear upon the flat inner faces of said belt-links immediately thereunder, said sub-frame having a medial upwardly-directed projection pivotally mounted on the said driving-shaft, said sub-frame having on one end an upwardly-directed projection provided with an arc-shaped slot concentric with said driving-shaft, said main-frame having a stud projected into said slot, and the other end of said sub-frame having an upwardly-directed projection under and adapted to engage the main-frame to limit the swing of said sub-frame on said driving-shaft.

Signed at Waterloo, Iowa, this 25th day of May, 1912.

HARRY W. LEAVITT.

Witnesses:
Wm. E. Ferguson,
Geo. C. Kennedy.